United States Patent
Lattyak

(10) Patent No.: US 8,700,384 B1
(45) Date of Patent: Apr. 15, 2014

(54) PROVIDING PROGRESSIVE LANGUAGE CONVERSION FOR DIGITAL CONTENT ON AN ELECTRONIC DEVICE

(75) Inventor: John Lattyak, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 743 days.

(21) Appl. No.: 12/165,049

(22) Filed: Jun. 30, 2008

(51) Int. Cl.
*G06F 17/28* (2006.01)

(52) U.S. Cl.
USPC ............................ 704/8; 704/3; 704/4; 704/5

(58) Field of Classification Search
CPC ... G06F 17/28; G06F 17/289; G06F 17/2872; G06F 9/44448
USPC .................................................. 704/8, 3, 4, 5
See application file for complete search history.

(56) References Cited

U.S. PATENT DOCUMENTS

| | | | |
|---|---|---|---|
| 4,764,976 A | | 8/1988 | Kallin et al. |
| 5,146,552 A | | 9/1992 | Cassorla et al. |
| 5,359,514 A | | 10/1994 | Manthuruthil et al. |
| 5,486,111 A | * | 1/1996 | Watkins ........................ 434/157 |
| 5,649,826 A | * | 7/1997 | West et al. ..................... 434/157 |
| 5,957,693 A | | 9/1999 | Panec |
| 6,370,498 B1 | * | 4/2002 | Flores et al. ....................... 704/3 |
| 6,438,515 B1 | * | 8/2002 | Crawford et al. ................. 704/5 |
| 6,683,611 B1 | | 1/2004 | Cleveland |
| 6,816,830 B1 | | 11/2004 | Kempe |
| 6,953,343 B2 | | 10/2005 | Townshend |
| 7,136,877 B2 | | 11/2006 | Volcani et al. |
| 7,270,546 B1 | | 9/2007 | Adams, Jr. et al. |
| 7,313,513 B2 | | 12/2007 | Kinder |
| 7,386,453 B2 | | 6/2008 | Polanyi et al. |
| 7,801,721 B2 | * | 9/2010 | Rosart et al. ...................... 704/8 |
| 7,818,164 B2 | * | 10/2010 | Wood et al. ...................... 704/5 |
| 7,905,391 B1 | | 3/2011 | Shilling |
| 7,912,717 B1 | | 3/2011 | Galick |
| 8,171,032 B2 | | 5/2012 | Herz |
| 2002/0120635 A1 | | 8/2002 | Joao |
| 2002/0182578 A1 | | 12/2002 | Rachman et al. |
| 2002/0199166 A1 | | 12/2002 | Volcani et al. |
| 2003/0068603 A1 | | 4/2003 | Cupp |
| 2003/0093275 A1 | | 5/2003 | Polanyi et al. |
| 2003/0152894 A1 | | 8/2003 | Townshend |
| 2004/0067472 A1 | | 4/2004 | Polanyi et al. |
| 2004/0117728 A1 | | 6/2004 | Gromer |
| 2004/0253568 A1 | | 12/2004 | Shaver-Troup |

(Continued)

OTHER PUBLICATIONS

Wikipedia article "Computer file" retrieved from the Internet Archive, dated Sep. 15, 2006.*

(Continued)

*Primary Examiner* — Vincent P Harper
(74) *Attorney, Agent, or Firm* — Lee & Hayes, PLLC

(57) ABSTRACT

A method for displaying a combination of languages for digital content in an electronic device is described. First digital content comprising a plurality of words in a primary language is received. Second digital content comprising a plurality of words in a secondary language is received. A combination of the primary language and the secondary language is determined. The combination of the primary language and the secondary language is displayed.

19 Claims, 12 Drawing Sheets

(56) References Cited

U.S. PATENT DOCUMENTS

| | | |
|---|---|---|
| 2005/0039121 A1 | 2/2005 | Cleveland |
| 2005/0131762 A1 | 6/2005 | Bharat et al. |
| 2005/0193335 A1 | 9/2005 | Dorai et al. |
| 2007/0011005 A1 | 1/2007 | Morrison et al. |
| 2007/0067294 A1 | 3/2007 | Ward et al. |
| 2007/0292826 A1 | 12/2007 | Goddy et al. |
| 2008/0070205 A1 | 3/2008 | Amick et al. |
| 2008/0140412 A1 | 6/2008 | Millman et al. |
| 2008/0229190 A1 | 9/2008 | Johnson |
| 2009/0092952 A1 | 4/2009 | Schlanger et al. |
| 2009/0246744 A1 | 10/2009 | Lofthus et al. |
| 2009/0263778 A1 | 10/2009 | Berger et al. |
| 2010/0153889 A1 | 6/2010 | Krause |
| 2010/0299205 A1 | 11/2010 | Erdmann et al. |
| 2011/0175805 A1 | 7/2011 | Rottler et al. |
| 2011/0306023 A1 | 12/2011 | Blank et al. |
| 2012/0030587 A1 | 2/2012 | Ketkar |
| 2012/0047455 A1 | 2/2012 | Yuan et al. |
| 2012/0088211 A1 | 4/2012 | Massaro |
| 2012/0233539 A1 | 9/2012 | Reed |
| 2012/0293529 A1 | 11/2012 | Che et al. |
| 2013/0080881 A1 | 3/2013 | Goodspeed et al. |
| 2013/0097164 A1 | 4/2013 | Welinder et al. |

OTHER PUBLICATIONS

U.S. Appl. No. 12/853,038, filed Aug. 9, 2010, Daniel B. Rausch, "Providing Electronic Books According to Reading Capability".

Office action for U.S. Appl. No. 12/853,038, mailed on Dec. 21, 2012, Rausch, "Providing Electronic Books According to Reading Capability", 15 pages.

Office action for U.S. Appl. No. 12/853,076, mailed on Mar. 14, 2013, Rausch, "Determining Reading Levels of Electronic Books", 13 pages.

Final Office Action for U.S. Appl. No. 12/853,038, mailed on May 22, 2013, Rausch, "Providing Electronic Books According to Reading Capability", 19 pages.

Office Action for U.S. Appl. No. 13/345,452, mailed on Nov. 4, 2013, Rainer V. Mager, "Selective Display of Pronunciation Guides in Electronic Books", 25 pages.

Office action for U.S. Appl. No. 12/853,076, mailed on Aug. 22, 2013, Rausch, "Determining Reading Levels of Electronic Books", 10 pages.

Office Action for U.S. Appl. No. 13/308,825, mailed on Sep. 13, 2013, Inventor #1 Mehal H. Shah, "Controlling the Rendering of Supplemental Content Related to Electronic Books" 22 pages.

Ribiere, et al., "The sBook: Towards Social and Personalized Learning Experiences", ACM, 2010, pp. 3-8.

\* cited by examiner

PROVIDING PROGRESSIVE LANGUAGE CONVERSION FOR DIGITAL CONTENT ON AN ELECTRONIC DEVICE

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded at any time via the Internet. In addition, the electronic device may be backed up so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. Benefits may be realized from improved systems and methods for interacting with an electronic device.

DETAILED DESCRIPTION

A method for displaying a combination of languages for digital content in an electronic device is described. First digital content comprising a plurality of words in a primary language is received. Second digital content comprising a plurality of words in a secondary language is received. A combination of the primary language and the secondary language is determined. The combination of the primary language and the secondary language is displayed.

The electronic device may be a wireless electronic device. In addition, the electronic device may be an eBook reader.

In one configuration, the first digital content may include mapping content. The mapping content may map a word in the first digital content to a translated word in the second digital content. The mapping content may also map a phrase in the first digital content to a translated phrase in the second digital content. Determining the combination of the primary language and the secondary language may include using the mapping content.

In one embodiment, the first digital content and the second digital content may be received at the same time.

An electronic device that is configured to display a combination of languages for digital content is also described. The electronic device includes a processor and memory in electronic communication with the processor. Executable instructions are stored in the memory. The instructions include instructions to access first digital content comprising a plurality of words in a primary language. Instructions to access second digital content comprising a plurality of words in a secondary language are also stored in the memory. Instructions determine a combination of the primary language and the secondary language. The instructions also include instructions to display the combination of the primary language and the secondary language.

A computer-readable medium comprising executable instructions is also described. The instructions include instructions to receive first digital content comprising a plurality of words in a primary language. Instructions to receive second digital content comprising a plurality of words in a secondary language are also stored in the memory. Instructions determine a combination of the primary language and the secondary language. The instructions also include instructions to display the combination of the primary language and the secondary language.

An electronic device that is configured to display a combination of languages for digital content is also described. The electronic device includes means for receiving first digital content comprising a plurality of words in a primary language. Means for receiving second digital content comprising a plurality of words in a secondary language are also included. The device also includes means for determining a combination of the primary language and the secondary language and means for displaying the combination of the primary language and the secondary language.

Figure 1:
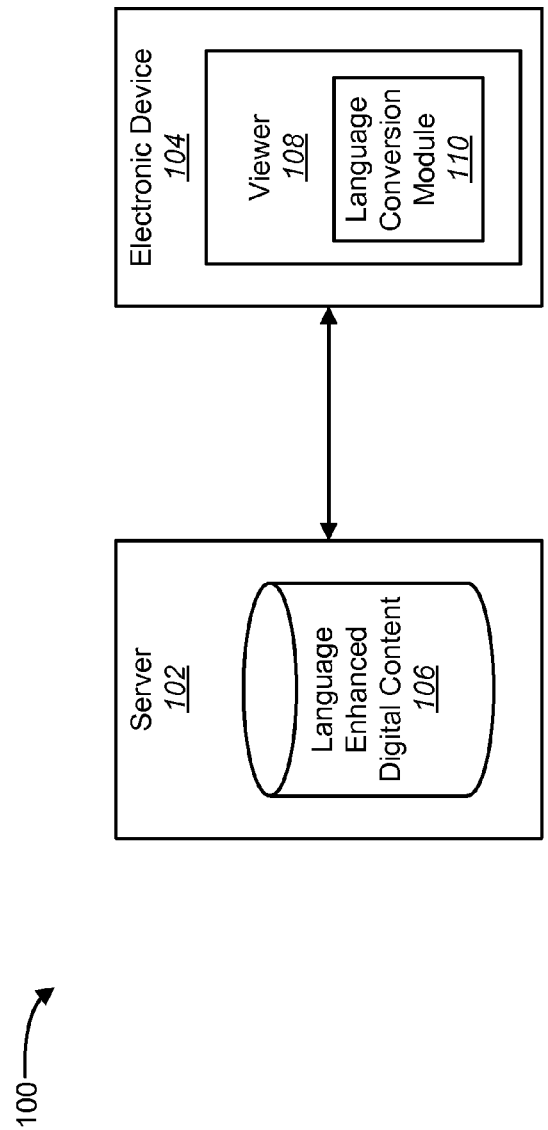
FIG. 1 is a block diagram illustrating a system for using a language conversion algorithm or module.

FIG. 1 is a block diagram illustrating a system 100 for using a language conversion algorithm 110 or module 110. In this system 100, a server 102 may communicate with an electronic device 104. The server 102 may be any type of computing device capable of communicating with other electronic devices and storing language enhanced digital content 106. Likewise, an electronic device 104 may be any computing device capable of communicating with a server 102. Some examples of electronic devices 104 include, but are not limited to, a personal computer, a laptop computer, a personal digital assistant, a mobile communications device, a smartphone, an electronic book (e-book) reader, a tablet computer, a set-top box, a game console, etc.

The language enhanced digital content 106 may reside on the server 102 to be distributed to a device 104 and may include various kinds of electronic books or digital content. Electronic books ("eBooks") are digital works.

The terms "eBook" and "e-book" are used synonymously and, as used herein, may include any type of content including textual information. By way of illustration, without limitation, eBooks may include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc. It may be stored in any electronic format known in the art that is readable by an electronic device.

The terms "digital work" and "digital content" are used synonymously and, as used herein, may include any type of content which may be stored and distributed in digital form. By way of illustration, without limitation, digital content and digital works may include all forms of content or information that can be stored and/or read by a computing device such as eBooks and all forms of audio and audiovisual works such as music, multimedia presentations, audio books, movies, etc. The digital content itself may be the text of an eBook. It may be stored in any electronic format known in the art that is readable by an electronic device. The term "language enhanced digital content" may be used to describe digital content that includes or is associated with mapping content (discussed below).

The language enhanced digital content 106 may be sent to the electronic device 104 (discussed in detail below). A viewer 108 may reside on the electronic device 104 for displaying, presenting, playing or otherwise reproducing the language enhanced digital content 106. This may involve visually displaying information or playing audio relating to the language enhanced digital content, or a combination of both. For instance, the viewer 108 may display the text of an eBook on a screen for a user to view or play a music file for the user to hear. The viewer 108 may use a language conversion module 110 to process the language enhanced digital content 106 for viewing. For example, in one configuration the language conversion module 110 may operate to transform or convert the display of language enhanced digital content 106 from a primary language into a hybrid of the primary language and a secondary language. The functionality of the language conversion module 110 will be discussed in further detail below.

Figure 2:
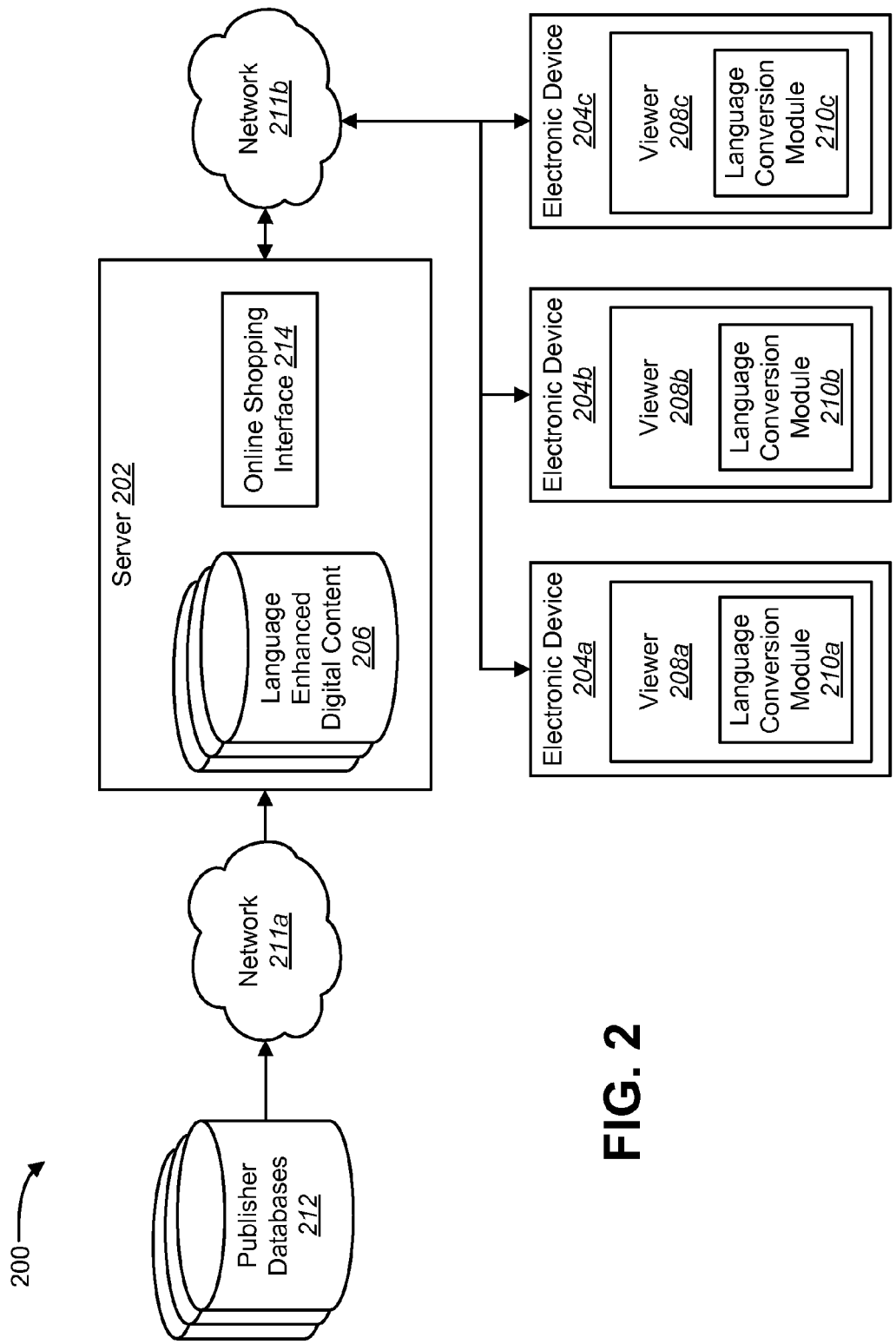
FIG. 2 is another block diagram illustrating a system for distributing language enhanced digital content for use by one or more language conversion algorithms or modules.

FIG. 2 is a block diagram illustrating a system 200 for distributing language enhanced digital content 206 for use by one or more language conversion algorithms 210 or modules 210. In this system 200, multiple publisher databases 212 may communicate with a server 202 through a network 211. In this configuration, the publisher databases 212 may send the language enhanced digital content 206 to the server 202. The publisher databases 212 represent the publishers, creators and/or providers of digital content. The digital content may be provided to the server 202 once, periodically, continuously, or otherwise as needed. For instance, a book publisher may send a particular eBook to the server 202 only once because the content of the book may not change, but a newspaper publisher may send its content every day since it may change daily. The mapping content associated with language enhanced digital content 206 may be prepared and provided by the publisher or by a third-party provider.

In addition to the language enhanced digital content 206, the server 202 may include an online shopping interface 214. The online shopping interface 214 may allow one more electronic devices 204 to communicate with the server 202 over a network 211, such as the Internet, and to further interact with the language enhanced digital content 206. This may involve a user of an electronic device 204 viewing, sampling, purchasing, or downloading the language enhanced digital content 206.

As discussed above in relation to FIG. 1, each electronic device 204 may include a viewer 208. The viewer 208 may be used to display or present the language enhanced digital content that has been received from the server 202. Furthermore, each electronic device 204 may include a language conversion module 210 that transforms or converts the display of language enhanced digital content 206 from a first language into a combination of the first language and a second language. In addition, three or more languages may also be included such that the language conversion module 210 may operate to convert the display of language enhanced digital content 206 from one of the languages into a combination of that language with any other language available. Combinations of three or more languages may also be provided.

Figure 3:
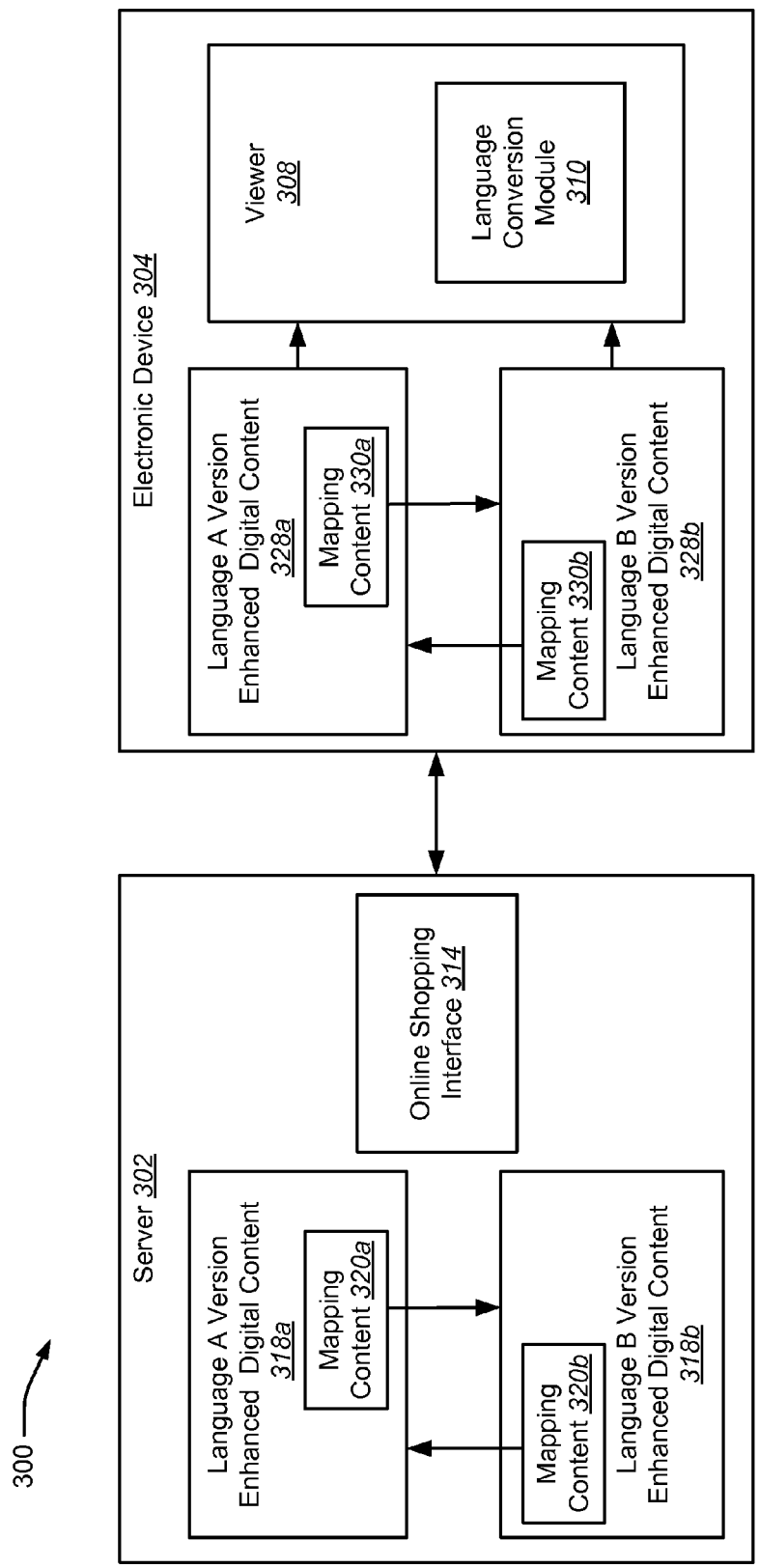
FIG. 3 is another block diagram illustrating a system for using a language conversion module to display digital content in a combination of two or more languages.

FIG. 3 is another block diagram illustrating a system 300 for using a language conversion module 310 to display digital content in a combination of two or more languages. In this system, a server 302 communicates with an electronic device 304. As discussed above in relation to FIG. 2, the server 302 may include an online shopping interface 314 that allows the electronic device 304 to view, sample, purchase, or download the language enhanced digital content 318. The server 302 may include a language A version of language enhanced digital content 318a and a language B version of language enhanced digital content 318b. Language enhanced digital content 318 may include the original digital content (the digital content without any mapping content) and mapping content 320a, 320b (see FIG. 8).

The language A version of language enhanced digital content 318a may include digital content in a first or primary language. The language B version of language enhanced digital content 318b may include digital content in a second or secondary language. In one example, the language A version of language enhanced digital content 318a may include the "Harry Potter and the Sorcerer's Stone" eBook in the English language, and the language B version of language enhanced digital content 318b may include the "Harry Potter and the Sorcerer's Stone" eBook in the Spanish language.

The language A version of language enhanced digital content 318a may include mapping content 320a. The mapping content 320a may provide mapping information from the language A version of language enhanced digital content 318a to the language B version of language enhanced digital content 318b. The mapping content 320a may link one or more words or phrases in the language A version of language enhanced digital content 318a to their counterpart words or phrases in the language B version of language enhanced digital content 318b. For example, the mapping content 320a may map the simple nouns in the first sentence of the first chapter in the English version to the corresponding simple nouns in the first sentence of the first chapter in the Spanish version. The mapping content 320a may also map groups of words together.

The language B version of language enhanced digital content 318b may also include mapping content 320b. The mapping content 320b in the language B version 318b may provide mapping information from the language B version of language enhanced digital content 318b to the language A version of language enhanced digital content 318a.

In one possible configuration, the different language versions may be included in the same enhanced digital content. For example, in this possible configuration a piece of enhanced digital content may include both a language A version and a language B version. In addition, the mapping content may also be included within the enhanced digital content. Thus, a single encapsulated file or container may include multiple language versions of digital content.

A further configuration may include three or more language versions in the same enhanced digital content. The present systems and methods may also be used with three or more language versions in more than one piece of enhanced digital content. Such configurations may allow a user to select the languages he or she wishes to view. For each additional language version included, additional mapping content may also be included to provide the mapping information for the additional language.

The electronic device 304 may receive the language A version of language enhanced digital content 328a and the language B version of language enhanced digital content 328b from the server 302. This may be in response to a user of the electronic device 304 interacting with the online shopping interface 314 residing on the server 302. As an example, a user of an eBook reader might purchase an eBook from a server 302 and then receive the eBook in the form of language enhanced digital content 328.

The electronic device 304 may include a viewer 308 that displays or presents the language enhanced digital content 328. The viewer 308 may include a language conversion module 310 that transforms or converts the display of language enhanced digital content from the first language into a combination of the first language and the second language using the mapping content 330a from the language A version of language enhanced digital content 328a and using the mapping content 330b from the language B version of language enhanced digital content 328b.

The language conversion module 310 is shown in FIG. 3 as being part of the viewer 308. However, in another configuration the language conversion module 310 may simply be part of the electronic device 304 and may not be part of the viewer 308. For example, the language conversion module 310 may be a separate program running on the device 304 that provides output to the viewer 308.

Figure 4:
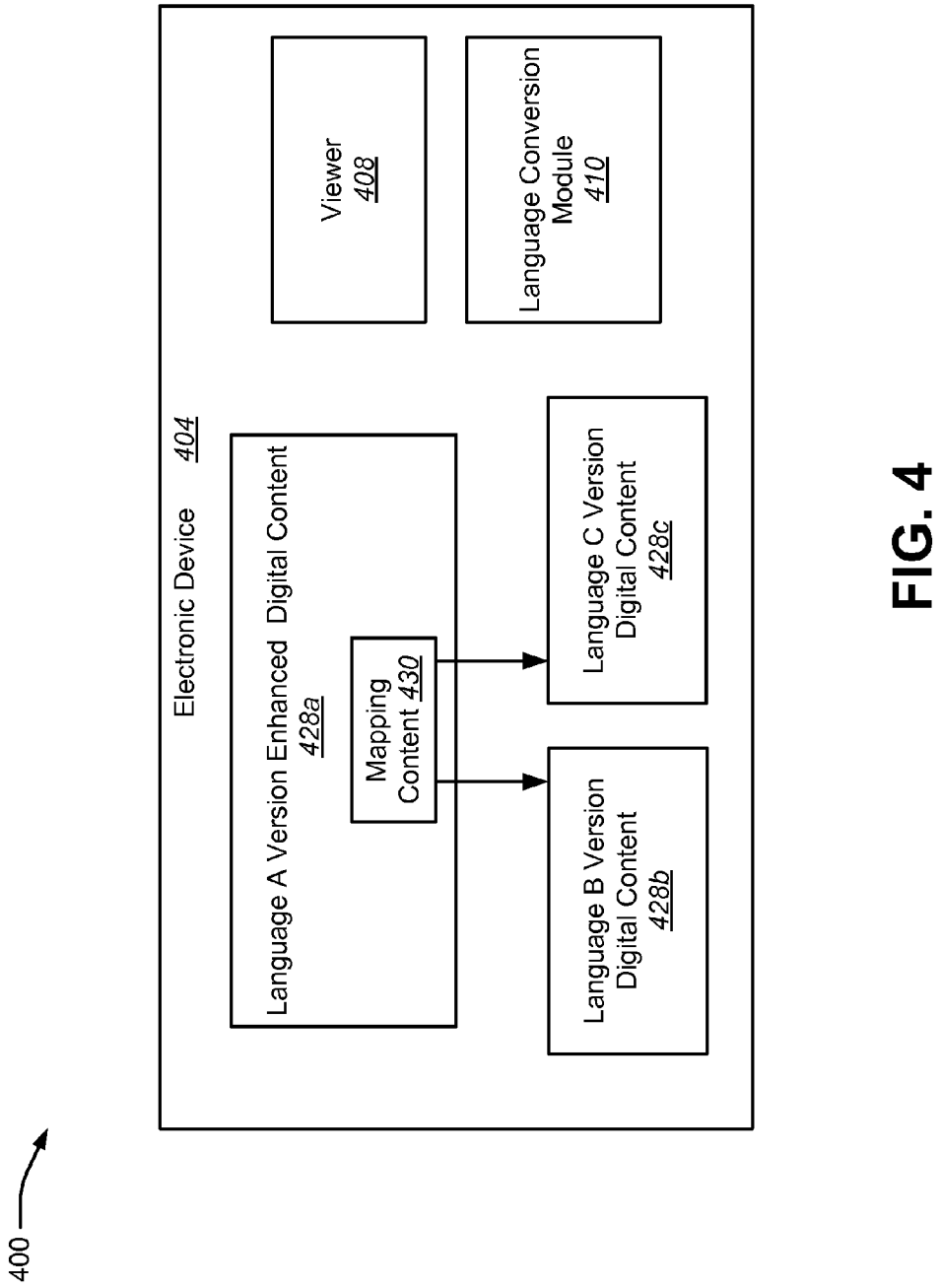
FIG. 4 is a block diagram illustrating another configuration of language enhanced digital content and mapping content.

FIG. 4 is a block diagram illustrating another configuration of language enhanced digital content 428 and mapping content 430. In the configuration of FIG. 4, the mapping content 430 may be included with one of the language versions which enables mapping to other language versions without requiring mapping content to be included with each language version. The language A version of enhanced digital content 428a includes mapping content 430 that maps the language A version 428a to the language B version 428b and also to the language C version 428c. Thus, the language B version 428b and language C version 428c may be original digital content that has not been language enhanced with mapping content 430. However, by providing mapping content 430 with the language A version 428a, the viewer 408 will be able to display a hybrid of one or more languages using the language conversion module 410.

The language conversion module 410 may not be part of the viewer 408. In the implementation illustrated in FIG. 4, the language conversion module 410 is a separate module or component from the viewer 408. In such a configuration, the language conversion module 410 may more easily be updated without affecting the viewer 408 module. In addition, as a separate component, the language conversion module 410 may also be more easily used by other components on the device 404.

Figure 5:
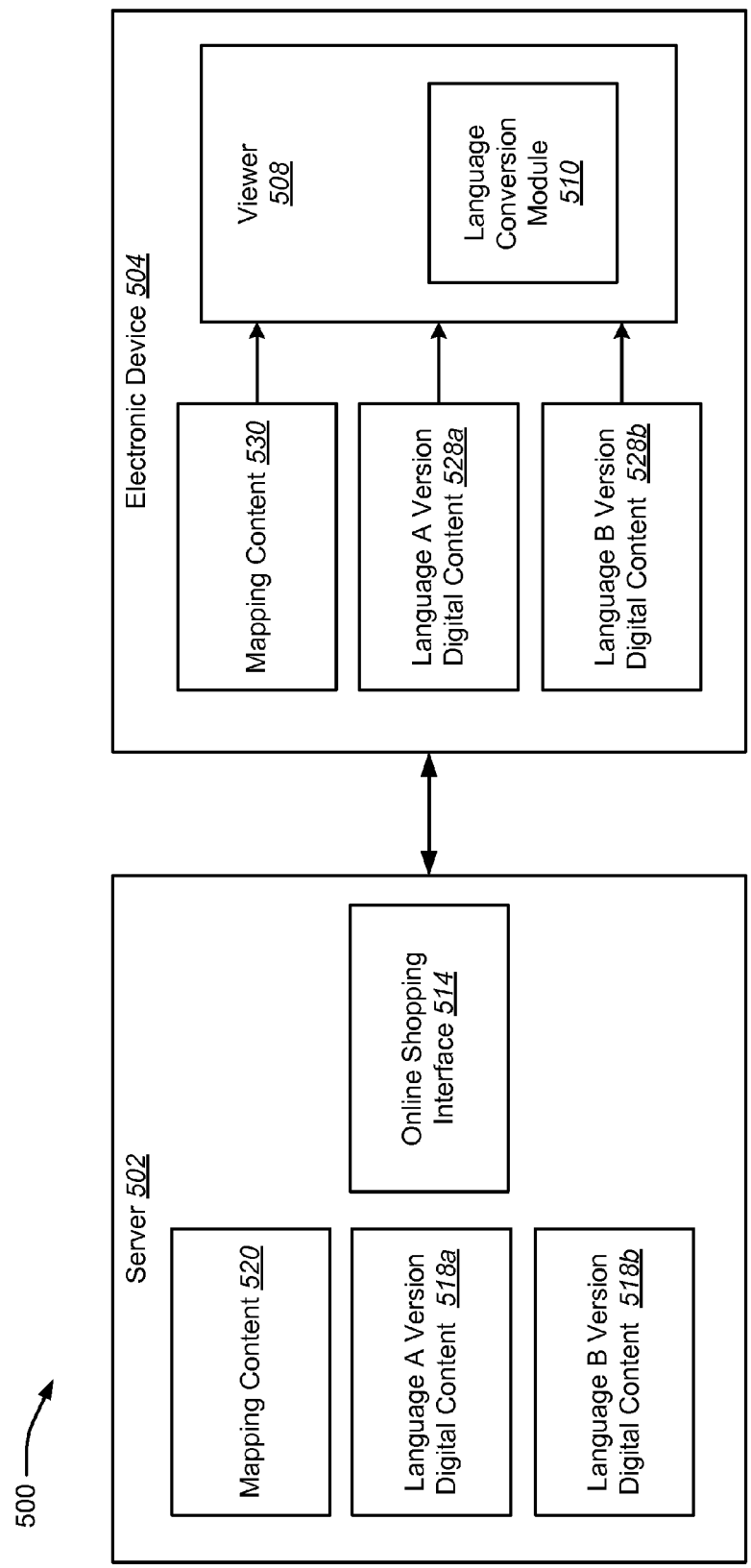
FIG. 5 is another block diagram illustrating a system for using a language conversion module to display digital content in a combination of two or more languages.

FIG. 5 is a block diagram illustrating another configuration of a system 500 for using a language conversion module 510 to display digital content in a combination of two or more languages. As discussed above, the server 502 may include an online shopping interface 514 that may allow the electronic device 504 to view, sample, purchase, or download digital content 518 and associated mapping content 520. In the configuration shown in FIG. 5, the mapping content 520 may be a separate digital work that may be obtained independently of the digital content with which it is associated.

The server 502 may include two or more digital content files 518: language A version of digital content 518a and language B version of digital content 518b. The server 502 may also include mapping content 520. The mapping content 520 may provide mapping information for linking the different language versions of the digital content files 518.

The electronic device 504 may receive the digital content files 528 and associated mapping content 530 from the server 502. The electronic device 504 may include a viewer 508 that allows viewing of the digital content file 528. The viewer 508 may include a language conversion module 510. The language conversion module 510 may transform or convert the display of the language A version of the digital content 528a to a combination display of the language A version of the digital content 528a and the language B version of the digital content 528b.

Figure 6:
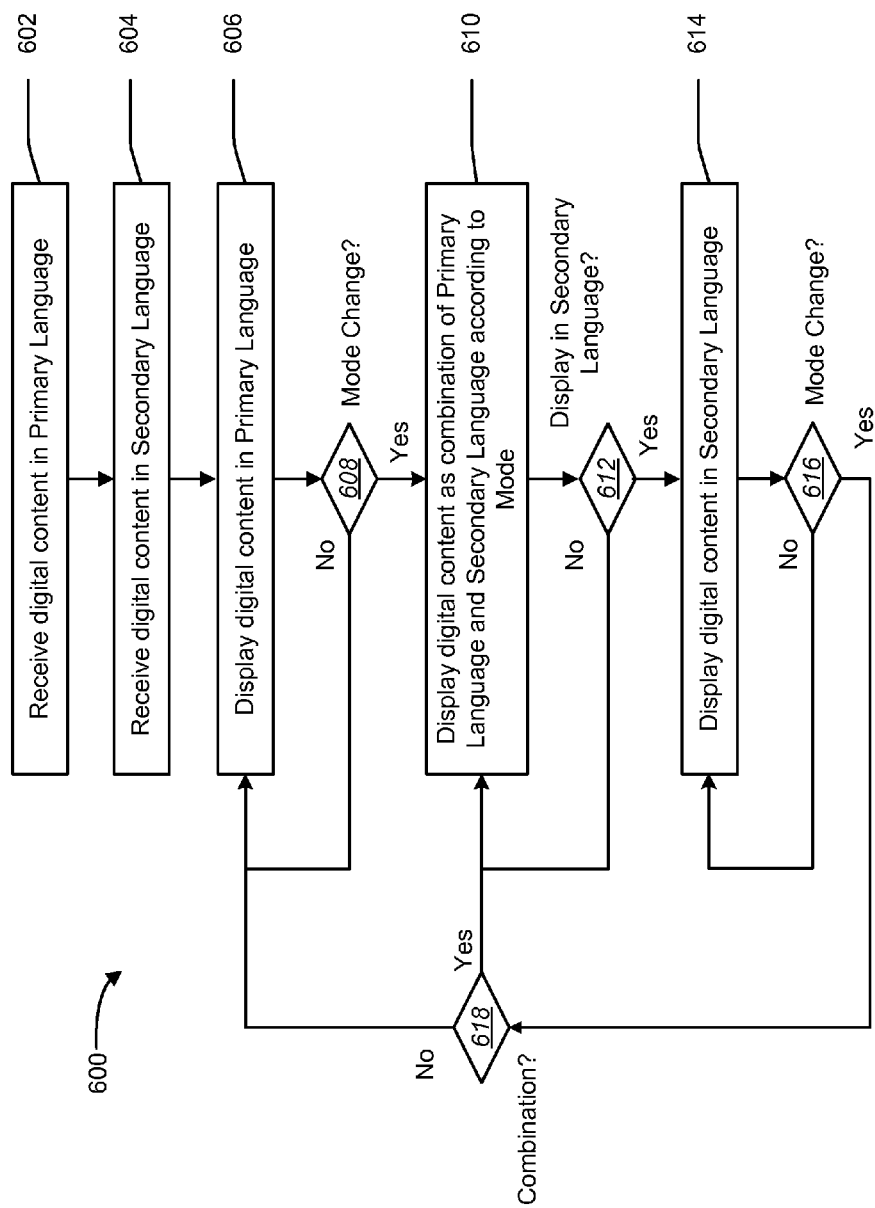
FIG. 6 is a flow diagram illustrating one configuration of a method for providing progressive language conversion of digital content on an electronic device.

FIG. 6 is a flow diagram illustrating one configuration of a method 600 for providing progressive language conversion of digital content on an electronic device 104. The electronic device 104 may receive 602 the digital content 106 in a primary language. The electronic device 104 may receive 604 the digital content 106 in a secondary language. The electronic device 104 may display 606 the digital content in the primary language. The electronic device 104 may receive input from a user to change 608 to a different display mode (e.g., display digital content in 25% Spanish). For example, in one configuration the device may include a dial or knob that a user may adjust to increase or decrease the percentage of the primary or secondary language.

If the user input requests a change 608 in display modes, the electronic device 104 may display 610 the digital content 106 as a combination of the primary language and the secondary language according to the mode selected. Various combinations of the primary language and the secondary language may be displayed. The electronic device 104 may receive input from a user to change 612 to a display mode in which only the secondary language is displayed. If the user input requests a change 612 to a secondary language only mode, the electronic device 104 may display 614 the digital content 106 in the secondary language. The device 104 may determine 616 when the next mode change is to occur changing display modes. If it is determined 616 that a change should take place, the device 104 may determine 618 whether the next display mode is a combination 610 display mode or whether the device should return to displaying 606 the primary language.

Figure 7:
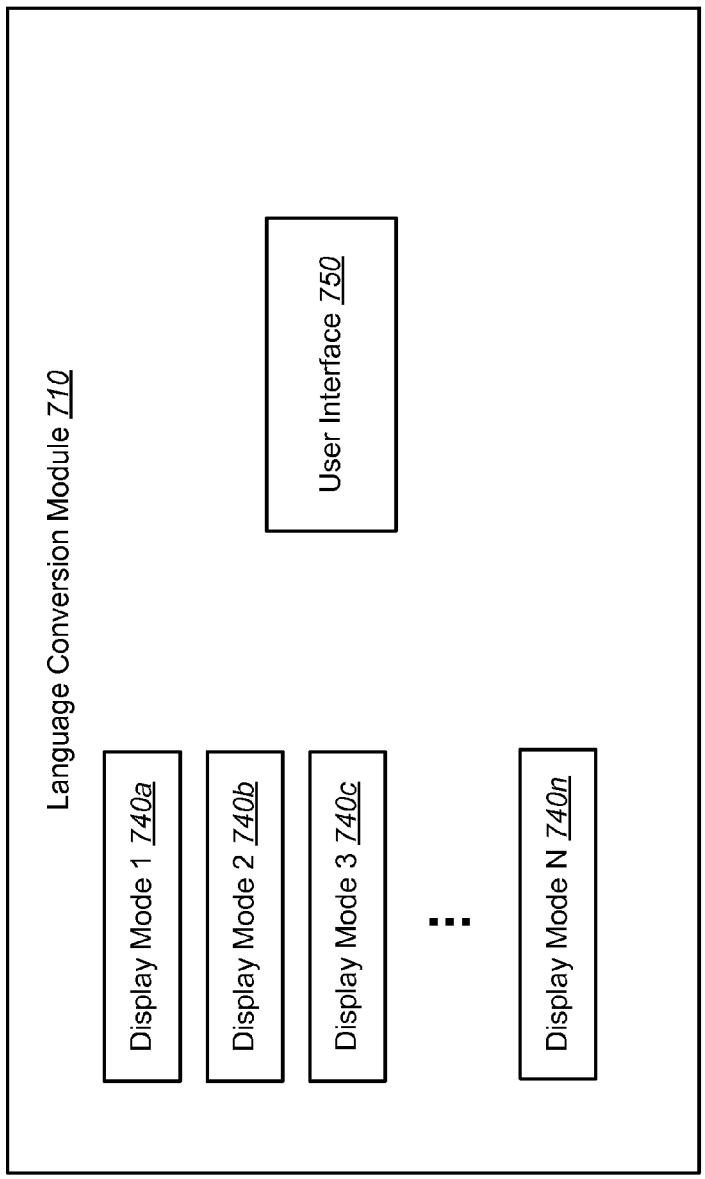
FIG. 7 is a block diagram illustrating one configuration of a language conversion module used in the present systems and methods.

FIG. 7 is a block diagram illustrating one configuration of a language conversion module 710 used in the various embodiments. As discussed above in relation to FIG. 1, a viewer 108 may use a language conversion module 710 to assist in the display of language enhanced digital content 106. The language conversion module 710 may provide a user with one or more display modes 740. The display modes 740 may indicate which words or phrases from each language version of the digital content are displayed. For example, a display mode 740a may indicate that the digital content is to be displayed in the language A version of the digital content (e.g., 100% in the primary language). Another display mode 740b may indicate that the digital content is to be displayed in the language B version of the digital content (e.g., 100% in the secondary language). Alternatively still, a further display mode 740c may dictate that the digital content is to be displayed in a specific combination of language A and language B.

Some examples of display modes with a combination of different languages will be set forth. As one example, when Display Mode 2 740b is selected, the viewer 108 may display the language A version of the digital content except the viewer 108 may display the simple nouns from the language B version of the digital content in place of the corresponding simple nouns from the language A version of the digital content. In yet another example, when Display Mode 3 740c is selected, the viewer 108 may display the language A version of the digital content except the viewer 108 may display simple numbers, colors, and verbs from the language B version of the digital content in place of the corresponding simple numbers, colors, and verbs from the language A version of the digital content.

In one configuration, each of the progressive display modes 740 may include all of the display exceptions of the previous display modes 740. For example, Display Mode 2 740b may include all of the display exceptions of Display Mode 1 740a along with all the display exceptions of Display Mode 2 740b. Likewise, Display Mode 3 740c may include all of the display exceptions of Display Mode 1 740a and Display Mode 2 740b along with all the display exceptions of Display Mode 3 740c. In another configuration, each of the progressive display modes 740 may include only the display exceptions for that particular display mode 740. For example, Display Mode 2 740b may include only the display exceptions of Display Mode 2 740b.

The language conversion module 710 may include a user interface 750. The user interface 750 may allow input from a user to select the display mode 740 to be displayed on the electronic device 104. For example, the user interface 750 may allow a user to switch between Display Mode 1 740a and Display Mode 2 740b while viewing digital content. The implementation of the user interface 750 will be discussed in more detail below.

Figure 8:
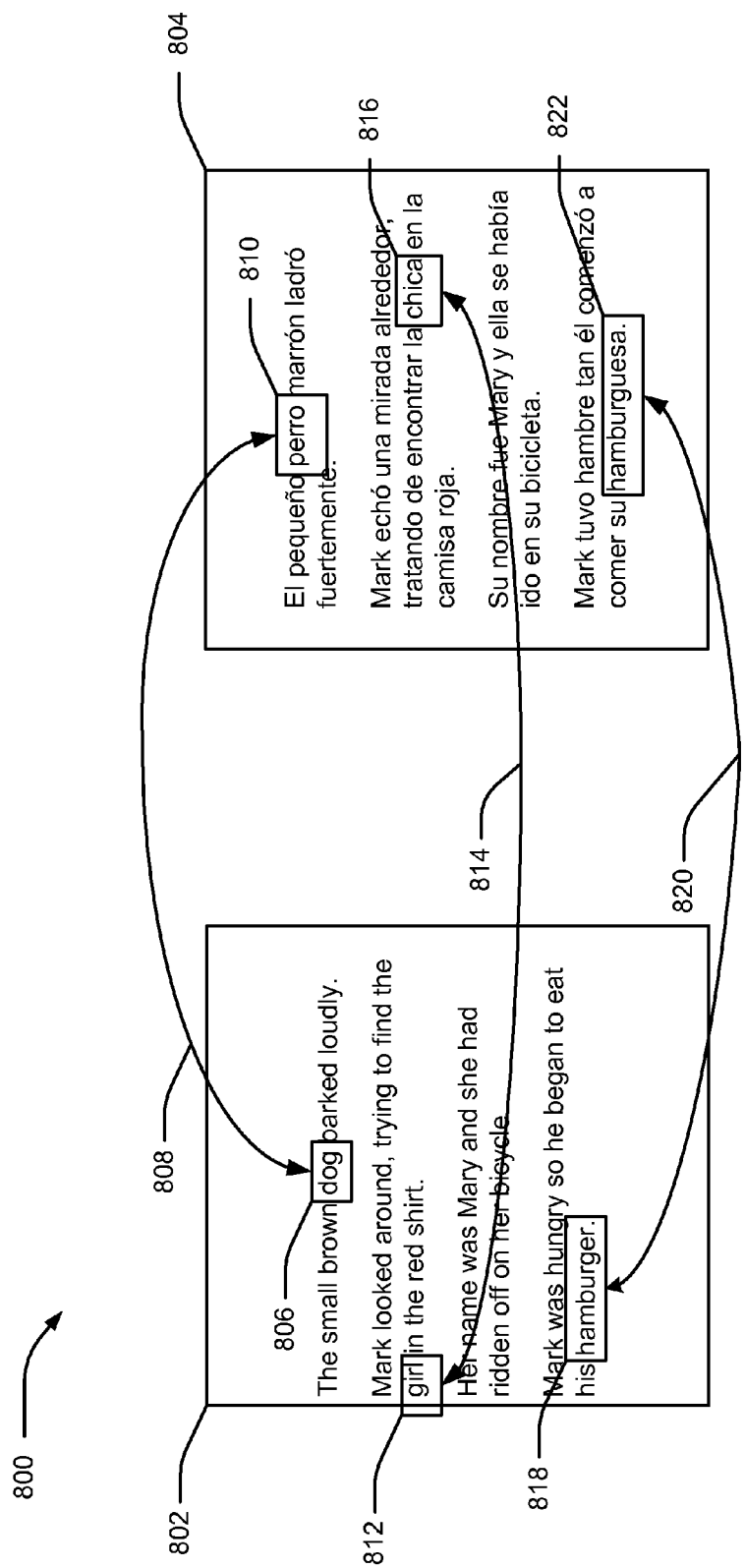
FIG. 8 illustrates the mapping content between an English version of digital content and a translated Spanish version of the digital content.

FIG. 8 is an illustration of the mapping content 800 between an English version of digital content 802 and a translated Spanish version of the digital content 804. As discussed above, the mapping content 800 may be implemented within each of the language enhanced digital content files 802 804, within a single language enhanced digital content file, in a separate mapping content file 530, or any combination thereof.

The English version of digital content 802 shown has four sentences. The translated Spanish version of digital content 804 has the same four sentences that have been translated into Spanish. For example, the English version of digital content 802 may include a first phrase "The small brown dog barked loudly." The Spanish version of digital content 804 may include a corresponding phrase "El pequeño perro marrón ladró fuertemente" that is the Spanish translated version of the first phrase.

The word "dog" 806 in the English version and the word "perro" 810 in the Spanish version have been mapped 808 to each other. Similarly, the word "girl" 812 in the English version and the word "chica" 816 in the Spanish version have been mapped 814 to each other. Also, the word "hamburger" 818 in the English version and the word "hamburguesa" 822 have been mapped 820 to each other. Mapping 808, 814, 820 may include a reference to the location of a word or phrase in a file, a physical location in memory, or the like. The mapping content 808, 814, 820 may be used to display a combination of English and Spanish as will be shown in FIGS. 9 and 10.

Figure 9:
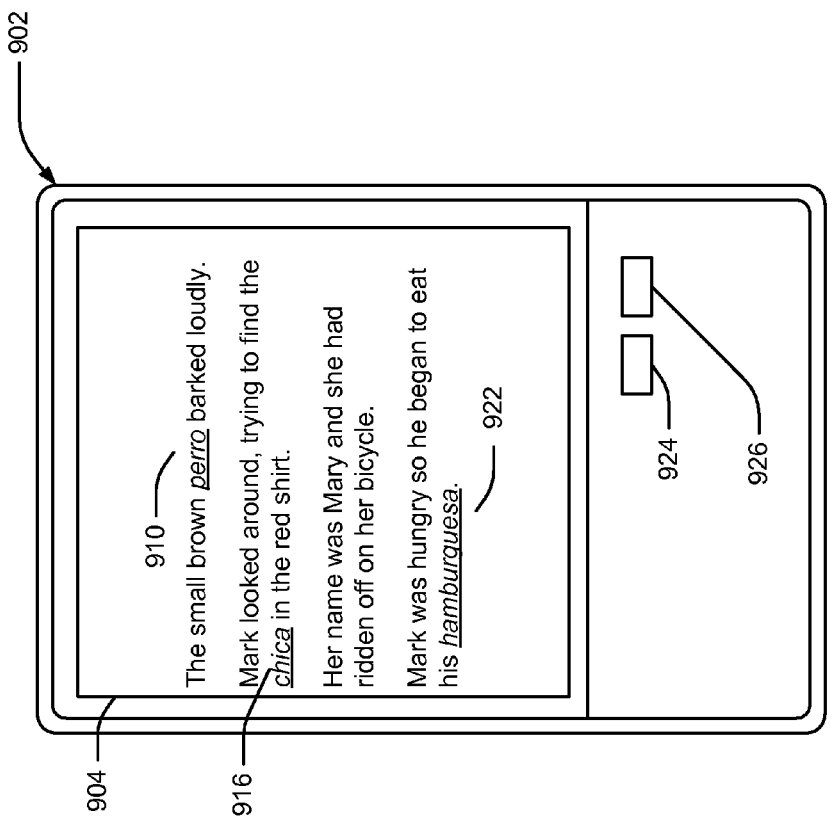
FIG. 9 illustrates one configuration of digital content being displayed in multiple languages on an electronic device.

FIG. 9 illustrates one configuration of digital content being displayed in multiple languages on an electronic device 902. The digital content may be displayed on a display screen 904 of an electronic device 902. The digital content may be displayed as a combination of two or more languages. In the configuration of FIG. 9, the digital content is displayed as a combination of English and Spanish according to the mapping 808, 814, 820 of FIG. 8, with English being the primary language and Spanish being the secondary language.

The text of the digital content may be displayed in the primary language. A display mode 740 may be selected using a user interface 750 on the electronic device. For example, a display mode 740 may be selected using a first button 924 and a second button 926 on the electronic device. The first button 924 may select a display mode 740 that displays fewer replacements of words and phrases from the secondary language. The second button 926 may select a display mode 740 that displays more replacements of words and phrases from the secondary language.

Depending on the display mode 740 selected, words and phrases in the primary language may be replaced with the translated words and phrases that have been previously mapped. The electronic device 902 may display the primary language sentence "The small brown dog barked loudly" except that the word "dog" may be replaced with the word "perro" 910 that has been mapped 808 from the Spanish translated digital content. Likewise, the electronic device 902 may display the primary language sentence "Mark looked around, trying to find the girl in the red shirt" except that the word "girl" may be replaced with the word "chica" 916 that has been mapped 814 from the Spanish translated digital content. Additionally, the electronic device 902 may display the sentence "Mark was hungry so he began to eat his hamburger" except that the word "hamburger" may be replaced with the word "hamburguesa" 922 that has been mapped 820 from the Spanish translated digital content.

The electronic device 902 may also display sentences in which no words have been mapped to the Spanish translated digital content and replaced. The sentence may not have been mapped. Alternatively, the mapped words may only be scheduled to be replaced in a different display mode 740. For example, the electronic device 902 may display the sentence "Her name was Mary and she had ridden off on her bicycle." Even though a language conversion display mode 740 has been selected, no words in the sentence have been replaced with their Spanish translated word.

As shown, the display mode of FIG. 9 displays the primary language, which happens to be English in this example, and replaces parts of the content with content from the secondary language. This example replaced simple nouns that had been mapped with their foreign language counterparts.

Figure 10:
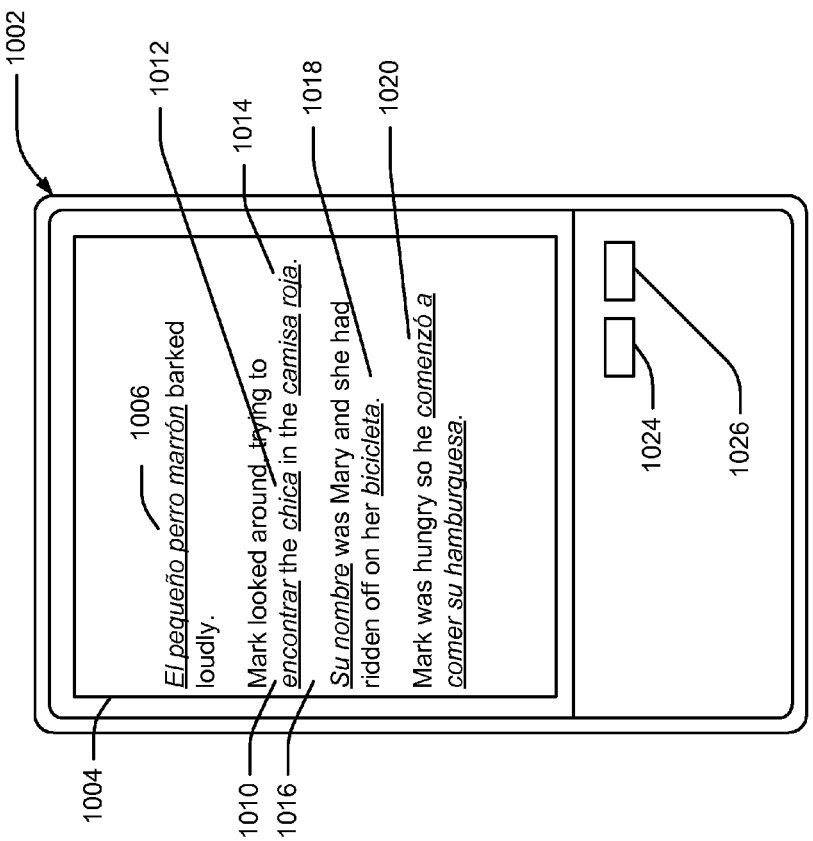
FIG. 10 illustrates another configuration of digital content being displayed in multiple languages on an electronic device.

FIG. 10 illustrates another configuration of digital content being displayed in multiple languages on an electronic device 1002. The digital content may be displayed on a display 1004 of the electronic device 1002. The digital content may be displayed as a combination of two or more languages. In the configuration of FIG. 10, the digital content is displayed as a combination of English and Spanish, with English being the primary language and Spanish being the secondary language.

In the example shown in FIG. 10, the display mode 740 replaces more than the example of FIG. 9. A display mode 740 may be selected using a first button 1024 and a second button 1026 on the electronic device 1002. The amount that may be substituted from one language version to another may vary widely depending on the mapping content and the amount of mapping information placed into the mapping content. The electronic device 1002 may display the primary language sentence "The small brown dog barked loudly" except that the phrase "The small brown dog" may be replaced with the phrase "El pequeño perro marrón" 1006 that has been mapped from the Spanish translated digital content.

Likewise, the electronic device 1002 may display the primary language sentence "Mark looked around, trying to find the girl in the red shirt" except that the word "find" may be replaced with the word "encontrar" 1010, the word "girl" may be replaced with the word "chica" 1012 and the phrase "red shirt" may be replaced with the phrase "camisa roja" 1014. These replacements may be due to the words and phrases having been mapped from the Spanish translated digital content.

The electronic device 1002 may display the primary language sentence "Her name was Mary and she had ridden off on her bicycle" except that the phrase "Her name" may be replaced with the phrase "Su nombre" 1016 and the word "bicycle" may be replaced with the word "bicicleta" 1018.

Additionally, the electronic device 1002 may display the sentence "Mark was hungry so he began to eat his hamburger" except that the phrase "began to eat his hamburger" may be replaced with the phrase "comenzó a comer su hamburguesa" 1020 that has been mapped from the Spanish translated digital content.

Figure 11:
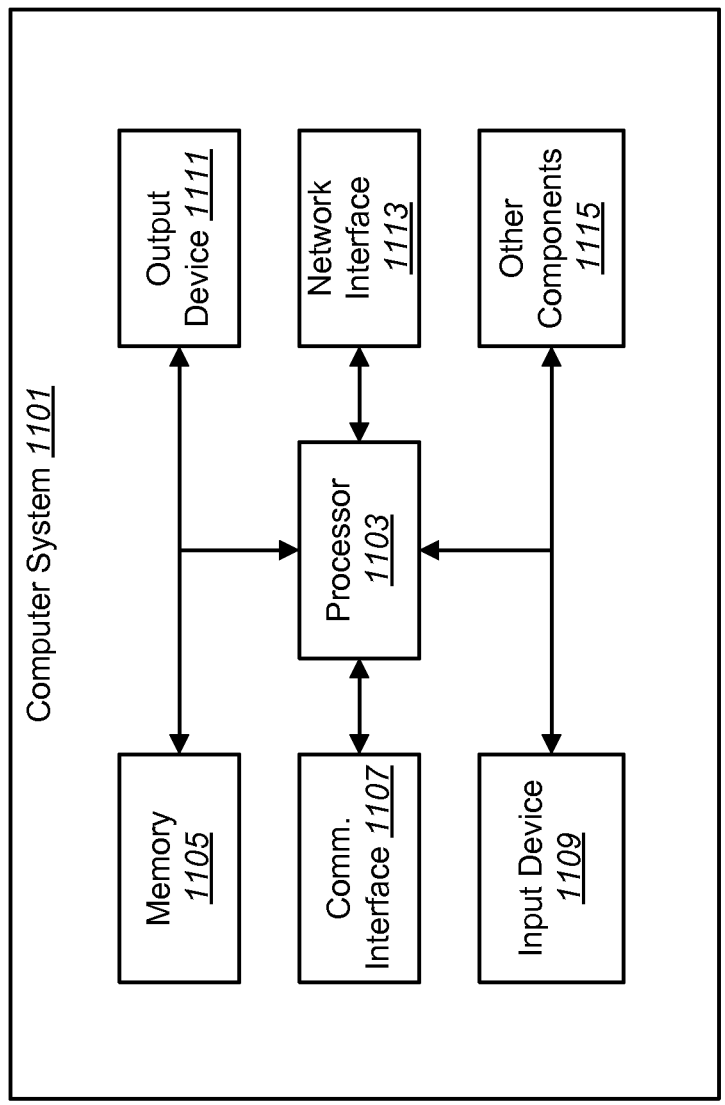
FIG. 11 illustrates various components that may be utilized in a computer system.

FIG. 11 illustrates various components that may be utilized in a computer system 1101 to implement one or more of the embodiments described herein. For example, a computer system 1101 may be used to implement a server 102 or an electronic device 104. The illustrated components may be located within the same physical structure or in separate housings or structures. Thus, the term computer or computer system 1101 is used to mean one or more broadly defined computing devices unless it is expressly stated otherwise. Computing devices include the broad range of digital computers including microcontrollers, hand-held computers, personal computers, servers 102, mainframes, supercomputers, minicomputers, workstations, and any variation or related device thereof.

The computer system 1101 is shown with a processor 1103 and memory 1105. The processor 1103 may control the operation of the computer system 1101 and may be embodied as a microprocessor, a microcontroller, a digital signal processor (DSP) or other device known in the art. The processor 1103 typically performs logical and arithmetic operations based on program instructions stored within the memory 1105. The instructions in the memory 1105 may be executable to implement the methods described herein.

The computer system 1101 may also include one or more communication interfaces 1107 and/or network interfaces 1113 for communicating with other electronic devices. The communication interface(s) 1107 and the network interface(s) 1113 may be based on wired communication technology, wireless communication technology, or both.

The computer system 1101 may also include one or more input devices 1109 and one or more output devices 1111. The input devices 1109 and output devices 1111 may facilitate user input. Other components 1115 may also be provided as part of the computer system 1101.

FIG. 11 illustrates only one possible configuration of a computer system 1101. Various other architectures and components may be utilized.

Figure 12:
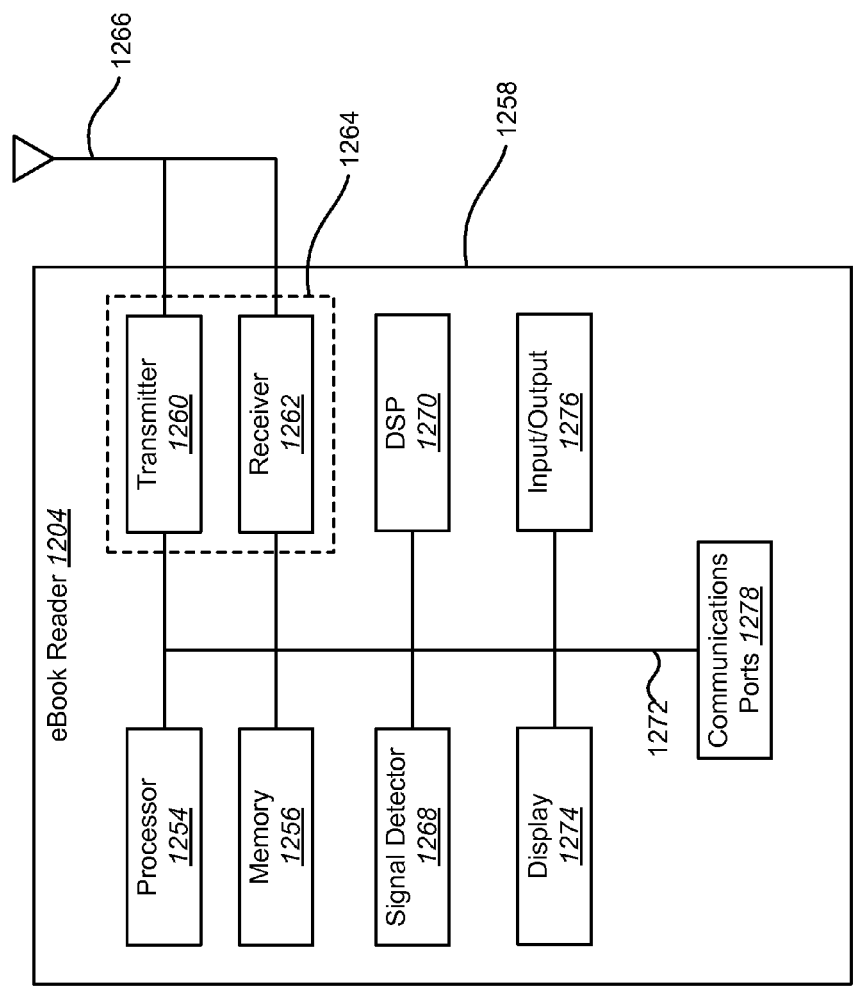
FIG. 12 illustrates various components that may be utilized in one configuration of an eBook reader.

FIG. 12 illustrates various components that may be utilized in one configuration of an electronic device 104. One configuration of an electronic device 104 may be an eBook reader 1204.

The eBook reader device 1204 may include a processor 1254 which controls operation of the device 1204. The processor 1254 may also be referred to as a central processing unit (CPU). Memory 1256, which may include both read-only memory (ROM) and random access memory (RAM), provides instructions and data to the processor 1254. A portion of the memory 1256 may also include non-volatile random access memory (NVRAM). The processor 1254 typically performs logical and arithmetic operations based on program instructions stored within the memory 1256. The instructions in the memory 1256 may be executable to implement the methods described herein.

The device 1204 may also include a housing 1258 that may include a transmitter 1260 and a receiver 1262 to allow transmission and reception of data between the wireless device 1204 and a remote location. The transmitter 1260 and receiver 1262 may be combined into a transceiver 1264. An antenna 1266 may be attached to the housing 1258 and electrically coupled to the transceiver 1264. The wireless device 1204 may also include (not shown) multiple transmitters, multiple receivers, multiple transceivers and/or multiple antenna.

The wireless device 1204 may also include a signal detector 1268 that may be used to detect and quantify the level of signals received by the transceiver 1264. The signal detector 1268 may detect such signals as total energy, pilot energy per pseudonoise (PN) chips, power spectral density, and other signals. The wireless device 1204 may also include a digital signal processor (DSP) 1270 for use in processing signals.

The wireless device 1204 may also include one or more communication ports 1278. Such communication ports 1278 may allow direct wired connections to be easily made with the device 1204.

Additionally, input/output components 1276 may be included with the device 1204 for various input and output to and from the device 1204. Examples of different kinds of input components include a keyboard, keypad, mouse, microphone, remote control device, buttons, joystick, trackball, touchpad, lightpen, etc. Examples of different kinds of output components include a speaker, printer, etc. One specific type of output component is a display 1274.

The various components of the wireless device 1204 may be coupled together by a bus system 1272 which may include a power bus, a control signal bus, and a status signal bus in addition to a data bus. However, for the sake of clarity, the various busses are illustrated in FIG. 12 as the bus system 1272.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® Blu-ray disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for displaying a combination of languages for digital content in an electronic device, the method comprising:
   receiving, at least partly in response to acquiring access to an electronic book, a version of the electronic book in a primary language, a version of the electronic book in a secondary language, and mapping content that associates words in the version of the electronic book in the primary language to corresponding words in the version of the electronic book in the secondary language;
   displaying, in an interface, a portion of content from the version of the electronic book in the primary language;
   presenting, in the interface, a control, wherein a selection of the control alters the displayed portion of content to display words corresponding to numbers or colors in the version of the electronic book in the secondary language in place of corresponding words in the primary language;
   receiving the selection of the control via the interface; and
   in response to receiving the selection of the control, altering the displayed words in the displayed portion of content by replacing words corresponding to numbers or colors of the version of the electronic book in the primary language with words corresponding to numbers or colors from the version of the electronic book in the secondary language.

2. The method of claim 1, wherein the electronic device comprises a wireless electronic device.

3. The method of claim 1, wherein the electronic device comprises an eBook reader.

4. The method of claim 1, wherein the altering the displayed words in the displayed portion of content is based at least in part on the mapping content.

5. The method of claim 1, wherein the version of the electronic book in the primary language and the version of the electronic book in the secondary language are received in a single file.

6. The method of claim 1, wherein the control includes one or more buttons, a dial, or a knob to receive the selection.

7. The method of claim 1, wherein the mapping content associates phrases in the version of the electronic book in the primary language to corresponding phrases in the version of the electronic book in the secondary language.

8. The method of claim 1, further comprising:
   receiving one or more subsequent selections of the control via the interface; and
   in response to receiving each of the one or more subsequent selections of the control, further altering the displayed portion of content of displayed words by replacing additional words of the version of the electronic book in the primary language with words from the version of the electronic book in the secondary language.

9. The method of claim 8, wherein the replacing the additional words comprises replacing, using the mapping content, one or more words corresponding to a particular part of speech in the version of the electronic book in the primary language with the one or more words corresponding to the particular part of speech in the version of the electronic book in the secondary language.

10. An electronic device that is configured to display a combination of languages for digital content, the electronic device comprising:
a processor;
memory in electronic communication with the processor;
instructions stored in the memory, the instructions being executable by the processor to:
receive a version of an electronic book in a first language, and a version of the electronic book in a second language;
display, via a user interface, a portion of the version of the electronic book in the first language, the user interface including a control for cycling through progressive display modes, wherein:
each progressive display mode includes an exception in which one or more words corresponding to numbers or colors are displayed in the second language in place of corresponding words in the first language; and
in response to one or more selections of the control, the displayed portion of digital content is reconfigured to include the one or more exceptions of the one or more respective preceding display modes and the exception of a current display mode.

11. The electronic device of claim 10, wherein the electronic device comprises a wireless electronic device.

12. The electronic device of claim 10, wherein the electronic device comprises an eBook reader.

13. The electronic device of claim 10, further comprising receiving mapping content that links words or phrases in the version of the electronic book in the first language to corresponding words or phrases in the versions of the electronic book in the second language.

14. The electronic device of claim 10, wherein the version of the electronic book in the first language, and the version of the electronic book in the second language are received by the electronic device in a single file.

15. The electronic device of claim 10, further comprising a dial or a knob as the control to select the progressive display modes of the electronic device.

16. A non-transitory computer-readable medium comprising computer-executable instructions that when executed by a processor perform operations comprising:
sending a request to obtain an electronic book;
receiving, at least partly in response to sending the request, a version of the electronic book in a primary language, and a version of the electronic book in a secondary language;
presenting an interface that displays the version of the electronic book in the primary language, the interface comprising a control for selecting one or more display modes, wherein each of the one or more display modes includes an exception in which one or more words corresponding to numbers or colors are displayed in the secondary language in place of corresponding words in the primary language;
receiving one or more selections of the control via the interface to change one of the one or more display modes; and
in response to receiving the one or more selections of the control, reconfiguring the displayed version of the electronic book to include the one or more exceptions of the one or more respective preceding display modes and the exception of a current display mode.

17. The non-transitory computer-readable medium as recited in claim 16, wherein the receiving, at least partly in response to sending the request, further comprises receiving mapping content.

18. The non-transitory computer-readable medium as recited in claim 17, wherein the mapping content maps a word or a phrase in the version of the electronic book in a primary language to a translated word or a translated phrase in the version of the electronic book in the secondary language.

19. The non-transitory computer-readable medium as recited in claim 16, wherein the receiving further comprises receiving versions of the electronic book in multiple secondary languages.

* * * * *